Jan. 10, 1950     L. J. MONTONE     2,493,923

HEATING, VAPORIZING, AND/OR BOILING WATER

Filed May 21, 1946

INVENTOR.
LIBER J. MONTONE.
BY
ATTORNEY.

Patented Jan. 10, 1950

2,493,923

UNITED STATES PATENT OFFICE 2,493,923

HEATING, VAPORIZING, AND/OR BOILING WATER

Liber J. Montone, Ithaca, N. Y.

Application May 21, 1946, Serial No. 671,409

3 Claims. (Cl. 219—40)

This invention relates to electrical appliances for heating or vaporizing water, and is particularly directed to facilitating the quick heating or boiling of the liquid. To this end the electrical heating elements are directly submerged in the water without being insulated therefrom, so that the electricity may heat the water by passing directly thru it, the walls of the container being used as the other electrode. The action is speeded by the provision of a great number of electrical discharge points made by punching the sheet metal full of rough holes or making it from screening whose cut edges provide numerous sharp points. This not only assists the electrical action but also permits rapid circulation of the liquid.

Referring now to the drawings forming part of this specification,

Similar reference numerals refer to similar parts thruout the various views.

Figure 1:
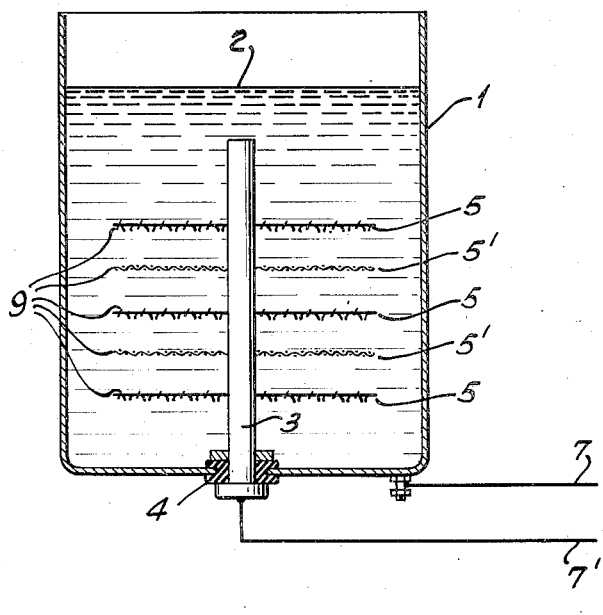
Fig. 1 is an elevation view partly in cross-section showing a typical embodiment of the invention.

In Fig. 1 there is illustrated a container 1 holding a liquid such as water 2 and provided with an internal supporting post or rod 3 which is insulated from the walls of the container 1 by suitable insulating material 4. Supported on the post 3 are a number of electrical discharge plates or screens 5 and 5' immersed in the water 2 so that electrical current may flow thru the water either between them or from them to the walls of the container and so heat the water directly because of its resistance. In the form shown in Fig. 1 the electricity is supplied to the walls of the container 1 and to the post 3 by any suitable means indicated diagrammatically by the wires 7 and 7'. Heaters of this general type may have various forms and arrangements with or without the container being part of the circuit and these are well known in the prior art. It is old to heat water by direct discharge and I make no broad claim thereto.

Figure 2:
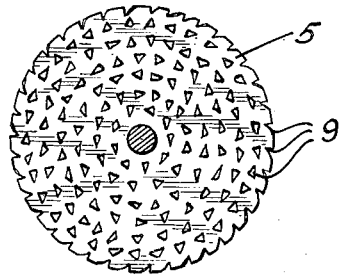
Fig. 2 is a detail plan view of one form of the heater element having multitudinous discharge points.
Figure 3:
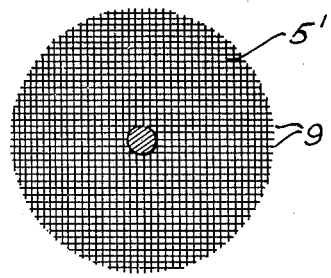
Fig. 3 is a detail plan view of another form of the heater element having multitudinous discharge points.

However, in the past the electrical discharge plates immersed in the water have been made of smoothly punched or smoothly woven material, generally free from rough ends or jagged points. As distinguished from this, the present invention provides innumerable little discharge points on the plates, as shown for example in Fig. 2 and Fig. 3. In Fig 2 the plate 5 is shown with multitudinous discharge points 9 made by roughly perforating the metal or cutting or tearing it or by any other method apparent to those skilled in the art. In Fig. 3 the discharge plate 5' is cut from woven wire or screening so that the raw edges provide a large number of sharp wires or points. Either or both may be used in a heater such as Fig. 1 or other well known type with a view to increasing the rapidity of action. Probably such points tend to enhance the electrical discharge and stimulate the local activity of the water. In any event, I have constructed such devices with the multitudinous points described and found them very effective in bringing water to a boil.

When the container wall is not part of the electrical circuit, the discharge plates alone may form a self-contained heating unit, by connecting some of them to one side of the electrical circuit and some to the other side, so that the current flow is merely between them. This is particularly useful when large volumes of water are to be heated, such as in tanks for example. The essential principle is the same whether or not the container is included in the circuit.

While I have in the foregoing described certain specific forms by way of example, it will be understood that they are for purposes of illustration to make clear the principles of the invention, which is not limited to the particular forms shown but is susceptible to various modifications and adaptations in different installations as will be apparent to those skilled in the art, without departing from the scope of the invention as stated in the following claims.

I claim:

1. In an electrical heating device for liquids, the combination of a container adapted to hold a liquid, a supporting means in said container, electrical discharge plates mounted on said support and adapted to be immersed in the liquid, said discharge plates being provided with a large number of small projections forming points of discharge together with a large number of openings to facilitate the circulation of the liquid, and means for supplying electricity to said plates and liquid to heat the liquid by direct action.

2. In an electrical heating device for liquids, the combination of a container adapted to hold a liquid, a supporting means in said container, electrical discharge means mounted on said support and adapted to be immersed in the liquid, said discharge means being provided with multitudinous small points of discharge together with multitudinous openings to facilitate the circulation of the water, and means for supplying electricity to said plates and liquid to heat the liquid by direct action.

3. In an electrical immersion heater for liquids, the combination of electrical discharge means adapted to be immersed in a liquid to be heated, said electrical discharge means being provided with multitudinous small points of discharge together with multitudinous openings to facilitate the circulation of the liquid, and means for supplying electricity to said electrical discharge means, whereby the liquid may be heated by direct action.

LIBER J. MONTONE.

REFERENCES CITED

The following references are of record in the file of this patent:

UNITED STATES PATENTS

| Number | Name | Date |
| --- | --- | --- |
| 1,707,122 | Hughes | Mar. 26, 1929 |
| 1,757,205 | Morris | May 6, 1930 |
| 2,140,516 | Cowan | Dec. 20, 1938 |